Dec. 17, 1968  E. S. ADAMCZYK  3,416,264
INDEXING GRINDING FEATURE
Filed Nov. 30, 1966  2 Sheets-Sheet 1

INVENTOR.
EDWARD S. ADAMCZYK
BY Kenwood Ross
ATTORNEY.

Dec. 17, 1968  E. S. ADAMCZYK  3,416,264
INDEXING GRINDING FEATURE

Filed Nov. 30, 1966  2 Sheets-Sheet 2

INVENTOR.
EDWARD S. ADAMCZYK
BY *Kenwood Ross*
ATTORNEY.

United States Patent Office 3,416,264
Patented Dec. 17, 1968

3,416,264
INDEXING GRINDING FEATURE
Edward S. Adamczyk, 47 Mazarin St.,
Indian Orchard, Mass. 01051
Filed Nov. 30, 1966, Ser. No. 597,905
1 Claim. (Cl. 51—216)

ABSTRACT OF THE DISCLOSURE

A work holder adapted to be secured to a work bed of a grinding machine etc., with an indexing workpiece. A base for mounting a fixture relative to the bed of the machine. A housing is pivotally mounted on the base with means for releasably locking the housing in any one of a plurality of angular positions relative to the base. A chuck collet extending longitudinally through the housing. A locking ring provided with circular row of equi-spaced axial openings sleeving the chuck collet and being normally rotatable relative to the housing. A retainer ring having a spring-loaded detent having a coaxial nose for seating engagement within one of the openings in the locking ring under force of the detent. Locking means in the housing for releasably locking the nose of the detent in one of the openings of the locking ring.

---

My invention relates to a work-holding fixture adapted to be secured to the work bed of a grinding or milling or like work-performing machine for supporting a workpiece or tool in operative relation with respect to the work-performing elements of the machine.

The invention teaches a novel work-carrying or tool-carrying spindle fixture adapted for adjustment in myriad positions relative to a tool, whereby the spindle and the workpiece or tool carried thereby can be accurately located in any desired position to which it may be selectively adjusted so as to be readily set for utilization in the rotary or fixed grinding of tapers, simple and compound angles, cam lobes and forms, and the like.

A primary object of the invention is to provide a fixture of the type described having a multiplicity of equi-spaced positive spindle stops with cooperant means for precise indexing to 15 seconds of an arc, error being non-accumulative at any spindle lock position.

Another object hereof is to improve upon prior art indexing workpiece or tool holding devices of this type by reducing the number of component parts and the overall size without sacrificing any of the usual functional capabilities and to provide chuck adjusting and indexing means which allow greater ease, speed and precision of manipulation than is possible in the use of devices heretofore known.

By the invention hereof, it is possible to provide means by which the angular relation of the rotational axis of the workpiece holding chuck and the axis of the tool of the machine to which the fixture is attachable may be varied without the use of such as complex screw mechanisms.

The fixture of the invention is intended to be adjustably mounted on a bed plate of a grinding or milling or like work-performing machine having a cooperant work-performing tool suitably driven from a power source, not shown, same not forming a part of the invention.

The fixture comprehends a substantially rectangular base 10, preferably formed of a magnetizable material, such as steel, so as to be secured by magnetic attraction to the grinding machine table, in known manner. Of course, other suitable means might be employed to mount the fixture securely to the machine table. To strengthen the magnetic attraction, base 10 is as massive as is consistent with compactness.

Figure 1:
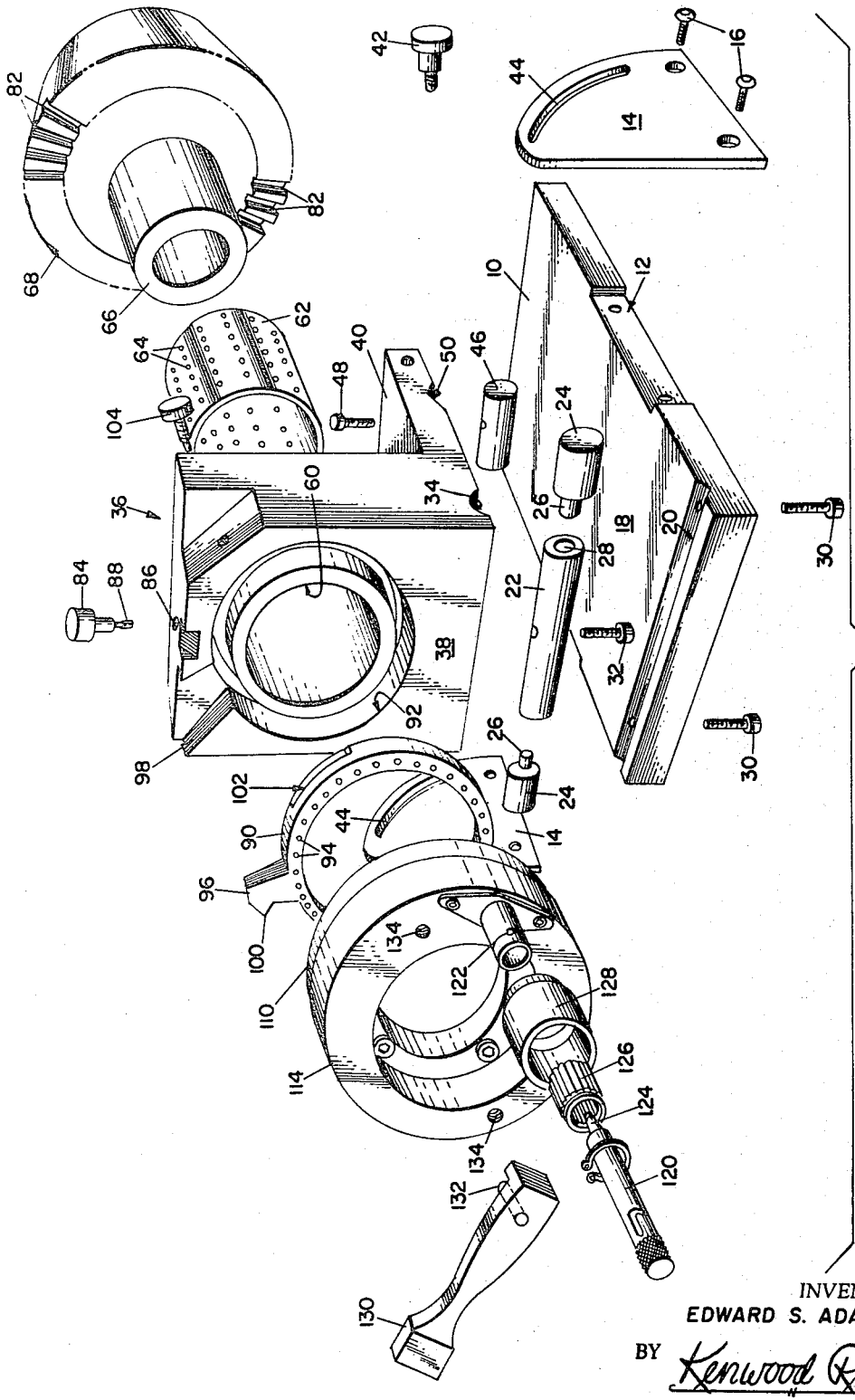
FIG. 1 is an exploded view, in perspective, showing a preferred embodiment of the fixture incorporating the invention.
Figure 2:
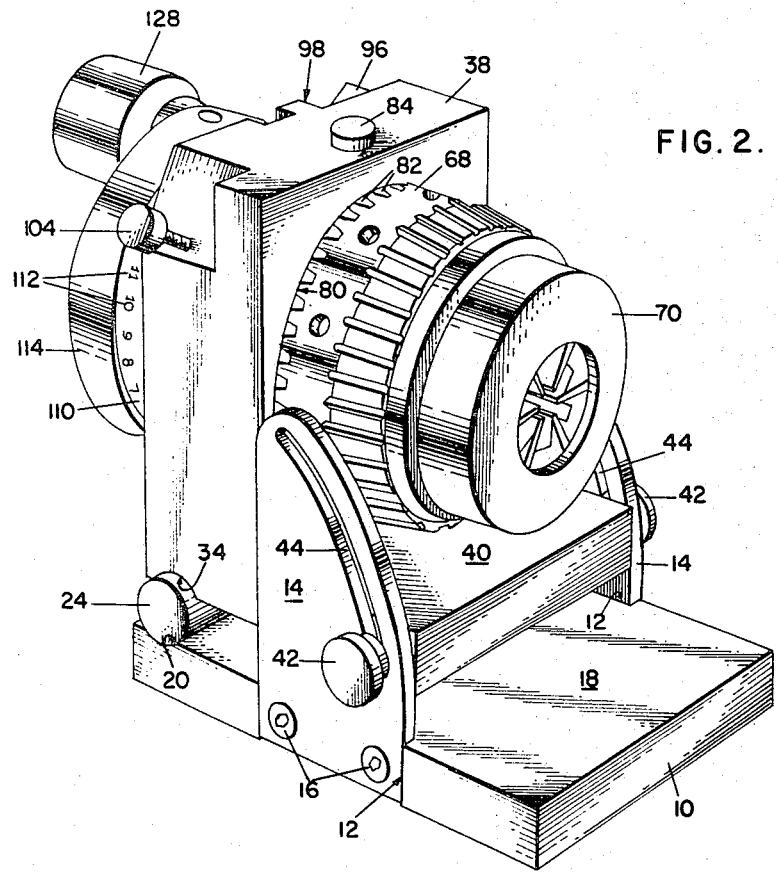
FIG. 2 is a view, in perspective, of the assembled fixture of FIG. 1 with the rotational axis of its chuck disposed in a horizontal position.
Figure 3:
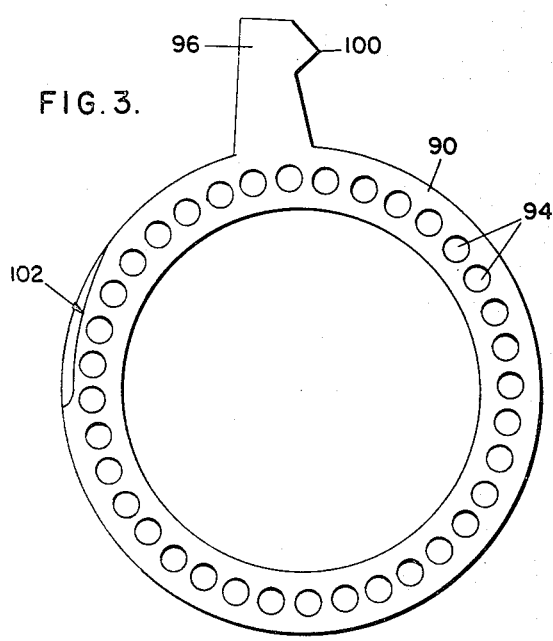
FIG. 3 is a view, in plan, showing the indexing ring component.

For orientation purposes, the front end of the fixture will be at the right, as viewed in FIGS. 1 and 2, and the rear end will be at the left.

The opposite side walls of base 10 are each provided with an inwardly-extending recess 12 for accommodating therein the lower end of an upstanding guide plate 14, secured to the base as by bolting 16.

Base 10 is provided on its upper planar face 18 with an inwardly and transversely-extending V-groove 20 for nestably accommodating therein an intermediate pivot roll 22 and a pair of outboard journal rolls 24 disposed coaxial with said pivot roll by means of a pivot pin 26 extending inwardly from an end face of each journal roll, each said pivot pin being receivable in a respective pivot pin recess 28 extending inwardly from a respective end of the pivot roll.

Journal rolls 24 are each fixed as by a screw 30 to base 10 and pivot roll 22 is fixed as by a screw 32 in a transversely-extending arcuate recess 34 provided in the lower planar surface of a spindle-supporting housing, generally indicated by 36, which housing is disposed upwardly of and normally in coplanar relationship with said base.

By the means of such journal rolls and pivot roll, rotative movement of the housing with respect to the base is allowed.

Housing 36 is of generally L-shaped configuration to define an upstanding bearing wall 38 normally disposed normal to base 10 and a sine subbase 40 fixed to and unitary with the lower end of the bearing wall and normally disposed in spaced coplanar relationship to the base, the sine subbase being disposed between guide plates 14 and adjustably secured thereto by means of thumb screws 42 extendable through respective arcuate slots 44 in each guide plate and threadedly engaged with the same subbase whereby the housing may be secured in any desired angular position within the limits defined by the arcuate slots.

A support roll 46 is fixed as by a screw 48 within a transversely-extending V-groove 50 provided in the lower face of subbase 40 adjacent the forward end thereof.

Pivot roll 22 and support roll 46 function conjointly to hold base 10 and sine subbase 40 in a normal spaced coplanar relationship as to each other, when the rotational axis of the fixture is generally horizontally disposed.

Housing 36 may be angularized relative to base 10 by loosening thumb screws 42 and manually pivoting the housing and pivot roll relative to the journal rolls to a desired position of angularization as may be determined by conventional sine blocks (not shown) which may be placed upon the upper planar surface of the base and under the support roll, whereupon the thumb screws may be again tightened so as to lock the housing in the predetermined angularized position.

Housing 36 is provided with a through bearing opening 60 extending from front to rear through and centrally of bearing wall 38 along a horizontally-disposed axis when the housing is in the normal FIG. 2 position.

The bearing opening of the housing is of such design as to allow rotative movement of the associated components receivable within or through said bearing opening, through 360° of adjustment about said horizontally-disposed axis.

Positionable within the bearing opening is a floating, tubular, ball-bearing retainer 62 defining accurately formed inner and outer cylindrical surfaces between which radially-extending openings are provided, which openings serve as seats for the reception and retention of antifriction devices in the form of ball bearings 64.

The diameter of each ball bearing is such that, when held by retainer 62, it projects outwardly of the planes of the inner and outer cylindrical surfaces so as to contact respectively the inner wall of bearing opening 60 and the outer periphery of a cylindrical rearwardly-extending extension 66 provided on a nose piece 68, which nose piece carries a conventional work-holding chuck 70 in threaded engagement therewith. The chuck grippingly engages and rotates a workpiece or tool.

As the nose piece is motivated, the bearing elements of the retainer are brought into pressure-confined engagement with the wall surfaces defining the bearing opening and the complemental peripheral surface of the nose piece extension, all whereby a preloaded ball bushing arrangement is provided.

The rearwardly-facing base wall of nose piece 68 is receivable in an annular recess 80 in the forwardly-facing side of bearing wall 38, which recess circumscribes and is concentric with bearing opening 60. The said base wall of the nose piece is provided with a plurality of circumferentially-spaced, radially-disposed inwardly-extending notches 82.

A locking knob 84 has a depending shank portion which is receivable in an opening 86 provided in the top of bearing wall 38 and communicating with bearing opening 60. Said shank portion terminates in a depending locking finger 88 extendable through opening 86 so as to be selectively engageable in notches 82 of nose piece 68. In this way, the nose piece and its chuck and workpiece may be securely locked in any one of a plurality of rotative positions.

An annular locking ring 90 is nestably seated in a suitable annular recess 92 provided in the rearwardly-facing side of bearing wall 38, which recess circumscribes and is concentric with bearing opening 60. The locking ring rides on the ball-bearing retainer.

Locking ring 90 is provided with a plurality of equispaced circumferentially-arranged axial openings 94 extending therethrough and a unitary tang 96 extending radially outwardly from its outer peripheral surface. The tang is receivable in a radial slot 98 provided in the rearwardly-facing side of bearing wall 38 and communicating with annular recess 92. The tang is so dimensioned with respect to the width of the radial slot that considerable rotative play of the locking ring within its annular recess 92 is permitted.

Figure 4:
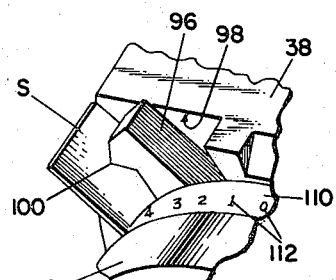
FIG. 4 is a fragmentary view, in perspective, of the radial sine plate abutment means of the indexing ring shown in FIG. 3 in cooperative relationship with a radial sine plate.

Tang 96 is provided with a nose 100 adapted to bear on one wall of radial slot 98 or upon a selected sine plate or plate S (see FIG. 4) which may be seated upon said one wall of the slot.

A segment of the outer peripheral surface of locking ring 90 is additionally provided with an arcuate forwardly-facing groove 102 having a depth gradually increasing from one end to the other, in which groove the inner end of a radially-disposed locking screw 104 threaded in bearing wall 38 is receivable.

A ring dial 110, bearing on its outer periphery numerical indicia 112 to provide for settings through a range of 0° to 360°, is fixed to the forward face of a retainer ring 114 so as to be disposed flush against locking ring 90 and the rearward face of bearing wall 38.

A spring-loaded detent 120 is slidably receivable within a tubular sleeve 122 which is fixed to and extends outwardly from the rearward face of retainer ring 114. The detent is provided with a nose 124 of appropriate size so as to be selectively receivable in openings 94 through indexing ring 90.

The detent is sleeved by an annular roller bearing 126 which is in turn sleeved by an annular manipulating knob 128.

A crank 130 has a forwardly-facing pin 132 provided at one end thereof, which pin is adapted to be selectively receivable in one of a plurality of openings 134 in retainer ring 114 so as to permit rapid locking or unlocking of the retainer ring.

When it is desired to rotate nose piece 68, detent 120 is released from its engagement in an opening 94 in indexing ring 90 and locking finger 88 is released from engagement with a notch 82 of the nose piece, whereupon manipulation of knob 128 serves to rotate the nose piece and the chuck and the workpiece or tool carried thereby.

The accuracy of the tool for rotary and fixed grinding of tapers, simple and compound angles, cam lobes and forms, is subject only to gage block limitations. Incorporating a plurality of positive spindle stops, indexing is precise to 15 seconds of arc; error is non-accumulative at any spindle lock position and there is no distortion under work load or pressure.

I claim:

1. In an indexing workpiece or tool holding fixture for a work-performing machine, a base for mounting the fixture relative to the bed of the machine, a housing pivotally mounted on said base, means for releasably locking said housing in any one of a plurality of angular positions relative to said base, a chuck collet extending longitudinally through said housing, a manipulatable annular locking ring sleeving said chuck collet and being normally rotatable relative to said housing and being provided with a circular row of equi-spaced axial openings, a retainer ring, a spring-loaded detent slideably disposed in said retainer ring and having a coaxial nose adapted for seating engagement within one of the openings of said locking ring under the force of the spring action of said detent, primary locking means in said housing for releasably locking the nose of said detent in one of the openings of said locking ring, and registering scales on said retainer ring and said locking ring bearing graduations of indicia within the range from 0° to 360°.

References Cited

UNITED STATES PATENTS

| | | | |
|---|---|---|---|
| 1,313,260 | 8/1919 | Coleman | 51—122 |
| 2,178,264 | 10/1939 | Meyer | 33—174 |
| 2,214,166 | 9/1940 | Hertlein | 51—216 |
| 2,700,854 | 2/1955 | Detrow | 51—216 X |
| 2,701,432 | 2/1955 | Kent | 51—216 X |
| 2,746,218 | 5/1956 | Bowie et al. | 51—216 X |
| 2,958,988 | 11/1960 | Crosby | 51—216 X |
| 3,298,141 | 1/1967 | Daubitz | 51—216 X |

MYRON C. KRUSE, *Primary Examiner.*